April 18, 1961 — S. M. MOBERG — 2,980,462

HAND-CLOSABLE DUAL SEAL

Filed Sept. 26, 1957

INVENTOR:
SIGURD M. MOBERG

BY Robert Henderson

ATTORNEY 2,980,462
Patented Apr. 18, 1961

2,980,462

HAND-CLOSABLE DUAL SEAL

Sigurd M. Moberg, Pompton Plains, N.J., assignor to E. J. Brooks Company, Newark, N.J., a corporation of New Jersey Filed Sept. 26, 1957, Ser. No. 686,407

1 Claim. (Cl. 292—315)

This invention relates to seals such as are employed to seal together two separable things in such manner that they cannot be separated without so damaging the seal as to give clear evidence of tampering or without breaking the seal so that it cannot be re-used.

Such seals are commonly used for sealing covers to various devices such as meters or boxes. In many instances, they are used in place of a lock where only discouragement of and evidence of tampering are desired. In other instances, however, they are employed in addition to locks so that, even if an interloper were able to open the lock and re-close it, he still could not open the box or other device to which the seal is applied and re-seal it without breaking the seal.

This invention deals, more particularly, with seals of the above-indicated character which may be applied quickly by hand and without the use of any tool and which are dual seals in the sense that they effect sealing in two respects against unauthorized opening or re-use.

An important object of this invention, therefore, is the provision of such a hand-closable, doubly effective seal.

Another important object is the provision of such a seal which is very inexpensive, being of such character that it can be made of inexpensive material and can be machine-produced economically in large quantities.

The foregoing and other more or less obvious objects are achieved according to the present invention, of which several embodiments are shown in the accompanying drawing, for illustrative purposes, without, however, limiting the invention to the particular disclosed embodiments.

Figure 3:
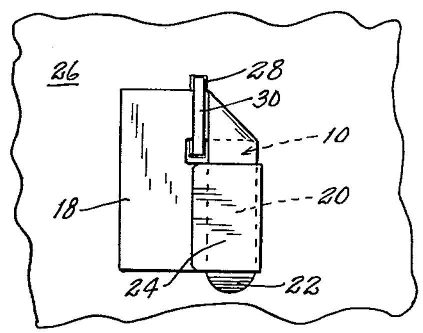
Fig. 3 is a similar view of the device as it appears following a second or final sealing deformation of the device.
Figure 4:
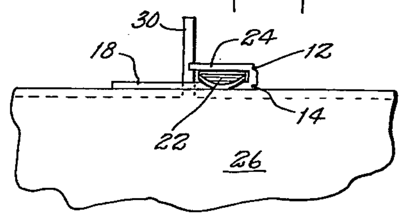
Fig. 4 is a side elevational view of the device as viewed from the bottom of Fig. 3.
Figure 5:
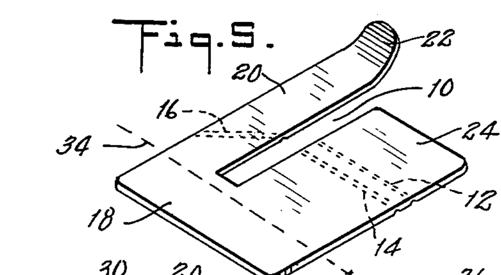
Fig. 5 is a perspective view of the device as delivered by the manufacturer to the user.

Referring first to Figs. 1–5, inclusive, the seal shown in Fig. 5, in a form in which it may be supplied by the manufacturer, is made from a blank of thin sheet metal of such character as to enable the seal to be used in ways hereinafter described. In manufacturing the device, the sheet metal is cut to the shape shown in Fig. 5 and, also, is additionally processed in a manner now to be described.

The form of the blank and the mentioned processing thereof are such that the greater area of the blank is approximately square in shape and includes a slot 10. The underside of the blank is provided with scores or equivalent lines of weakness 12, 14 and 16 which, as hereinafter explained, constitute lines at which the device may readily be bent in use and which also have the effect that breakage will occur at such lines upon unbending or opening of the seal.

The mentioned lines of weakness have the effect of demarking the device into several portions, to wit: a body portion 18 partially defined by the scores 14 and 16, into which body portion the inner end of slot 10 extends; a primary sealing tongue 20 which adjoins the body portion at the score 16, the extremity of this tongue being bent upwardly, as at 22, for a purpose later to be explained; and a secondary sealing tongue 24 which substantially adjoins the body portion 18 at the scores 12 and 14, the two latter scores being closely parallel to each other and serving to provide what is in effect a single bending point of a breadth corresponding to the distance between said scores. It will be noted that the scores 12 and 14 extend in a direction normal to the direction in which the slot 10 extends, and that the score 16 extends at an angle of approximately 45° to the slot 10.

Figure 1:
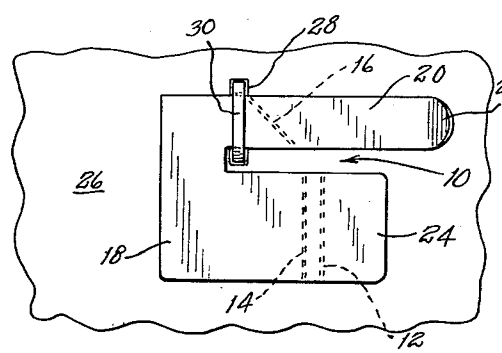
Figure 1 is a top plan view of a seal according to a first, preferred embodiment of the invention as it appears in an initial step in its application upon a cover to hold the latter in place upon a box or equivalent device.

Referring to Fig. 1, there is shown fragmentarily a portion 26 of a cover of something to be closed and sealed, which, for present purposes, will be referred to as a box. A slot 28 is formed in the cover and, when the cover is on the box, a hasp-eye 30, integral with the box protrudes through the slot 28.

Figure 2:
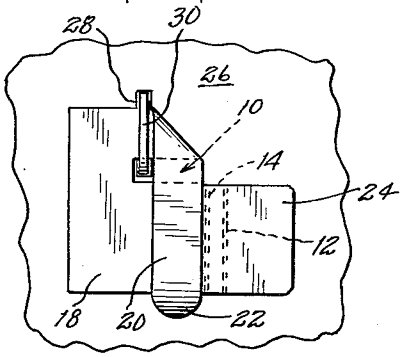
Fig. 2 is a similar view of the device as it appears following a first sealing deformation of the device.

In order to apply the seal to the described box-and-cover arrangement, the user lays the seal down upon or against the cover 26 at the left side of the hasp-eye 30, then slides the primary sealing tongue 20 through the hasp-eye, and continues this movement until the hasp-eye is in a position substantially at the inner end of slot 10. When the seal is in the mentioned position as it appears in Fig. 1, the score 16, having passed through the hasp-eye, is entirely clear of the latter. This enables the user to bend the tongue 20 bodily arcuately upwardly and then downwardly in relationship to the body 18 at the score 16 to bring the seal into its condition as shown in Fig. 2, whereafter the user may bend the secondary sealing tongue 24 bodily leftwardly, first upwardly and then downwardly so that it will intimately overlie the tongue 20, as illustrated in Fig. 3.

The last-mentioned bend, in effect, is a single bend but, in actuality, may be considered as a double bend because bending occurs along both scores 12 and 14, those scores both being provided to compensate for the thickness of tongue 20 so that the secondary tongue 24 may rest intimately upon the tongue 20, as may be understood from Fig. 4. It may also be understood from Fig. 4 that the bend end 22, when the seal is closed, extends downwardly to a plane coincident with the plane of the body portion 18, thereby minimizing the possibility that the tongue 20 might accidentally be engaged and mutilation of the seal caused before its intended opening.

In order to open the described seal, the user must first bend secondary sealing tongue 24 upwardly at least to right-angular relationship to body portion 18 and preferably somewhat beyond such right-angular relationship. That has the effect of freeing tongue 20 so that the user may then bend that tongue back approximately to its position as shown in Fig. 1, whereafter the seal may easily be withdrawn from the hasp-eye 30. During such opening of the seal it is probable that breakage will occur at either one of scores 12 and 14 and also at score 16, so that the seal could not possibly be re-used. However, if such breakage does not occur upon opening of the seal, it would certainly occur at one or more of the scores 12, 14 and 16 as a result of further bending in any attempt to re-use the seal.

As line of weakness 16 is oblique with respect to tongue 20, it is sometimes referred to herein as an "oblique" line of weakness. As lines of weakness 12 and 14 are normal with respect to tongue 20, they or either of them are sometimes referred to herein as a "normal" line or lines of weakness.

Figure 6:
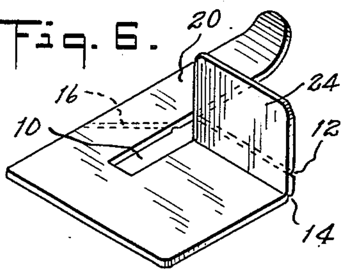
Fig. 6 is a view somewhat similar to Fig. 5, but showing the device in a form to which it may be processed by the manufacturer before delivery to the user.

Although, for compactness of packing, the manufacturer might deliver the seal to the user in the form shown in Fig. 5, the manufacturer could, if desired, impose upon the seal, as a final step in its manufacture, a bend at score 14 as shown in Fig. 6.

Figure 7:
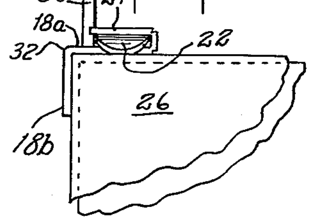
Fig. 7 is an end view of the same device as applied to an article to be sealed, but illustrating still another way in which it may be further processed by the manufacturer before delivery to the user.

Also, if desired, the manufacturer could, as a further manufacturing step, impose an additional bend 32 in the seal (Fig. 7), the approximate location of this bend being indicated by the dotted line 34 in Fig. 5. The bend 32 converts the body portion 18 of Figs. 1–5 into a primary body portion **18*a* and a secondary body portion 18*b*. A seal with such a bend 32 would be supplied, however, only where the user contemplated employing the seal in connection with a hasp-eye 30 located adjacent to an edge or right-angular corner of a box cover 26** as shown in Fig. 7.

Seals, with bends formed therein by the manufacturer as just explained with reference to Figs. 6 and 7, may or may not be considered to constitute distinct or separate embodiments of the invention.

Figures 8, 9:
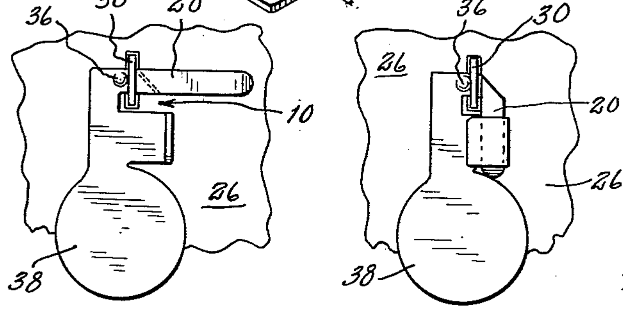
Fig. 8 is a view similar in character to Fig. 1, but showing a seal according to a further embodiment of the invention.
Fig. 9 is a view similar in character to Fig. 3, showing the seal of Fig. 8 as completely applied in use.

The seal illustrated in Figs. 8 and 9, as furnished to the user by the manufacturer, differs from the seal in its form illustrated in Fig. 6 in only two respects: (1) it is formed with a bump 36 on its top face and (2) it includes an integral tab 38. The bump 36 is adjacent to the inner end of slot 10 and in line with primary sealing tongue 20, and is provided merely to serve as a means for positively limiting the extent to which the tongue 20 may be slid into a narrow aperture in the hasp-eye 30. If the benefit of such a bump is desired, the aperture in the hasp-eye would be in the nature of a slot only slightly wider than the thickness of the sheet material of which the seal is made, so that the bump 36 could not pass through said aperture. The tab 38 may serve to receive thereon some indicia such as a name or initials, or a number or a trademark, etc., of the user of the device. By comparing Figs. 8 and 9, respectively, with Figs. 1 and 3, one may readily understand the manner in which the embodiment of Figs. 8 and 9 operates, such operation in both cases being alike.

It will be obvious that the concepts disclosed herein may be used in various other ways without, however, departing from the invention as set forth in the following claim.

I claim:

A hand-closable dual seal, of sheet metal of substantially uniform thickness, comprising a sheet metal body portion and two parallel sheet metal sealing tongues integral with said body portion and separated by a space an inner part of which extends substantially into said body portion, said seal having a first line of weakness at an angle of approximately 45° to the line of parallelism of said tongues, demarking one of said sealing tongues from said body portion, and extending outwardly, in the direction of said one tongue and toward the other of said sealing tongues, from a point distant, to the extent of the thickness of a hasp-eye, from the inner end of said space, said line of weakness facilitating manual, bodily bending of said one tongue over the space's said inner part and into intimate, overlapping relationship with said body portion, and a second line of weakness, normal to said line of parallelism, outwardly of and approximately in line with the outermost end of said first line of weakness, demarking said other of the sealing tongues from said body portion and facilitating manual, bodily bending of said other tongue into intimate, overlapping relationship with said thus-bent one tongue with an edge of said one tongue extending closely adjacent and parallel to said second line of weakness to hold said one tongue against unbending except upon unbending of said other tongue to the extent of approximately 90°; said seal being adapted for bending only at said lines of weakness, and said one of the sealing tongues being adapted for insertion into a hasp-eye and, when thus bent over, being in position to abut the hasp-eye to oppose withdrawal of the last-mentioned sealing tongue therefrom.

References Cited in the file of this patent

UNITED STATES PATENTS

| | | |
|---|---|---|
| 972,971 | Wood | Oct. 18, 1910 |
| 1,576,059 | Moritz | Mar. 9, 1926 |
| 1,847,552 | Brooks | Mar. 1, 1932 |
| 2,772,109 | Busch et al. | Nov. 27, 1956 |
| 2,800,349 | Moberg | July 23, 1957 |

FOREIGN PATENTS

| | | |
|---|---|---|
| 111,187 | Great Britain | Dec. 6, 1916 |
| 467,947 | Italy | Dec. 28, 1951 |

Dedication 2,980,462.—*Sigurd M. Moberg*, Pompton Plains, N.J. HAND-CLOSABLE DUAL SEAL. Patent dated Apr. 18, 1961. Dedication filed Feb. 9, 1972, by the assignee, *E. J. Brooks Company*.

Hereby dedicates to the Public the term thereof remaining after Oct. 1, 1970.

[*Official Gazette July 11, 1972.*]